July 19, 1966 W. J. CONOVER 3,261,324
LIVESTOCK RAISING BUILDING
Filed Dec. 10, 1964 3 Sheets-Sheet 1

INVENTOR
WILLIAM J. CONOVER
BY
ATTORNEY

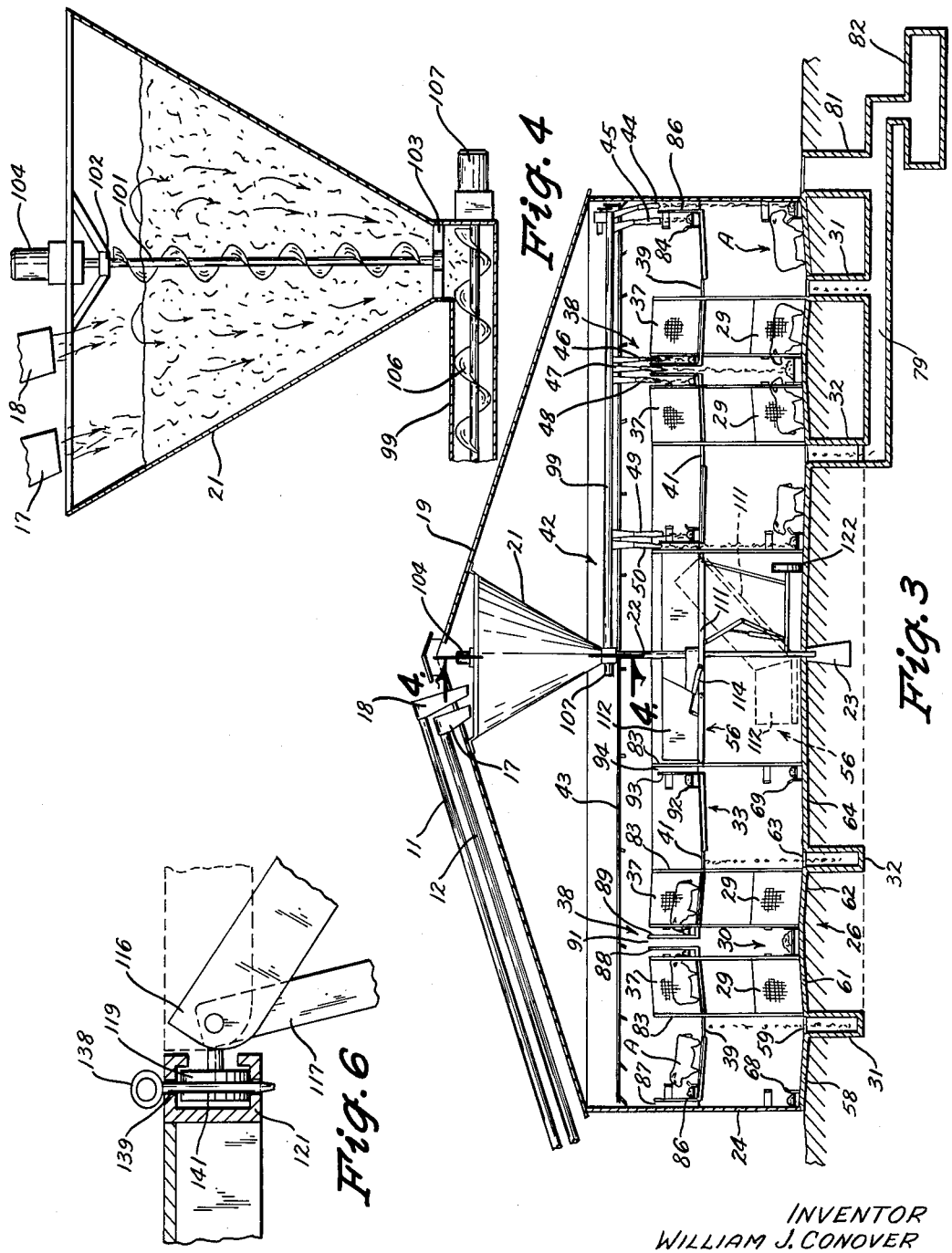

July 19, 1966    W. J. CONOVER    3,261,324
LIVESTOCK RAISING BUILDING
Filed Dec. 10, 1964    3 Sheets-Sheet 3
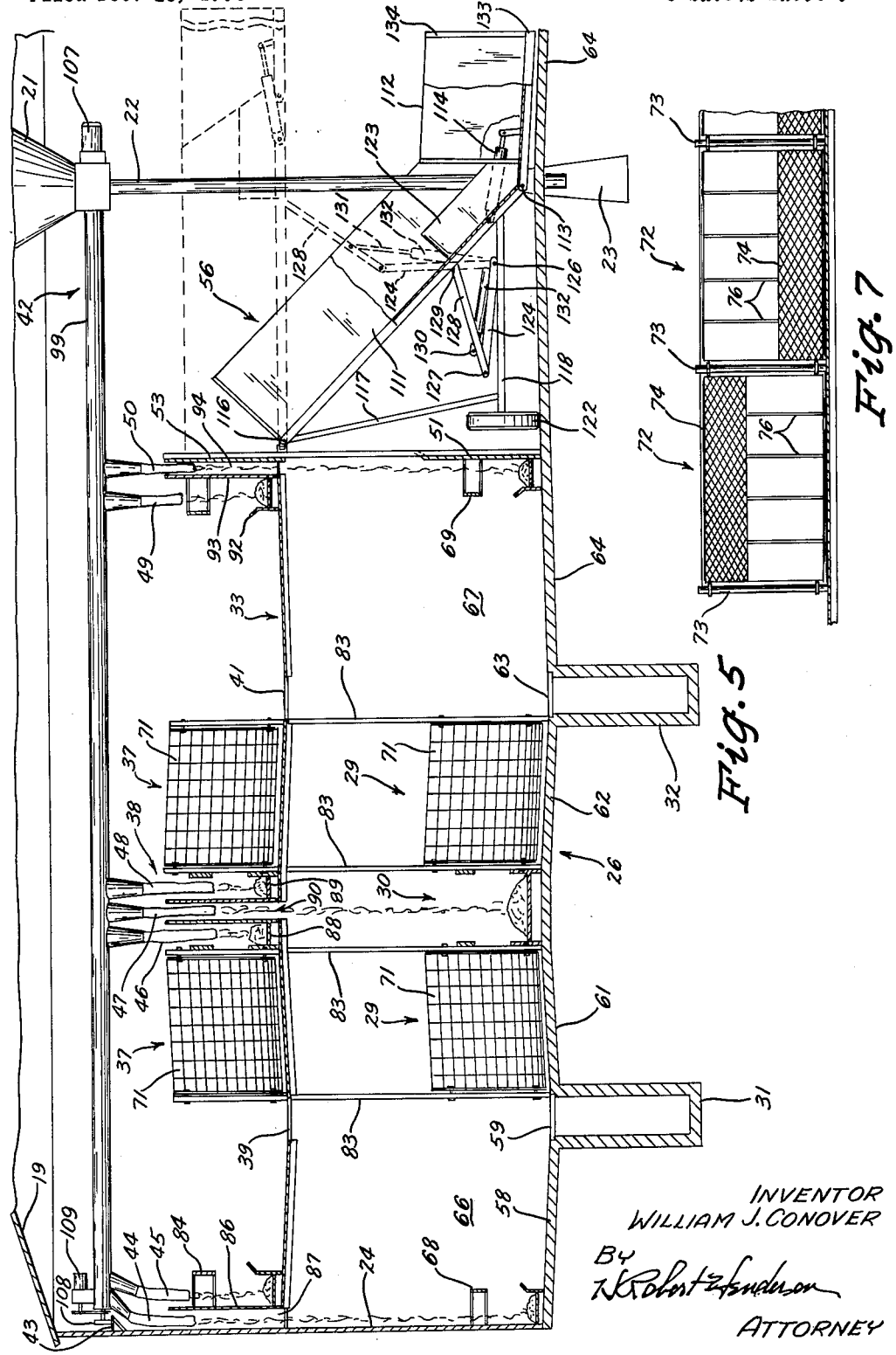
INVENTOR
WILLIAM J. CONOVER
BY
N. Robert Henderson
ATTORNEY

United States Patent Office 3,261,324
Patented July 19, 1966

3,261,324
LIVESTOCK RAISING BUILDING
William J. Conover, Rhodes, Iowa
Filed Dec. 10, 1964, Ser. No. 417,335
10 Claims. (Cl. 119—16)

This invention relates generally to the raising of livestock, and relates particularly to an improved enclosure for carrying on the raising under the most ideal conditions. It is, therefore, an object of this invention to provide an improved livestock enclosure.

It is another object of this invention to provide an improved livestock enclosure in the form of an all weather building which affords ideal feeding and care conditions while economizing on space requirements.

Another object of this invention is the provision of a livestock feeding building which requires substantially no attention due to the provision of automatically operated means for feeding and watering the livestock, and for removal of the offal by action of the animals themselves.

Yet another object of this invention is the provision of a building for raising livestock wherein the building is of a shape to use a minimum of floor space for a pair of rows of animal stalls on a first floor, where a second floor with like rows of stalls is provided, and where the arrangement requires but a single overhead feed mechanism for simultaneously supplying feed for the stalls of both floors.

Still another object of this invention is to provide such a building as hereinbefore described, and further where all waste matter is quickly disposed of by the construction of the building combined with the action of the animals.

It is another object of this invention to provide a building for raising livestock, the building as described hereinbefore wherein each mother and her offspring can be maintained in a single stall with adequate nourishment automatically provided, and with adequate semi-automatic removal of all waste products, and wherein at the appropriate time, any or all stalls can be easily adjusted to permit free movement in defined and restricted areas of either or both mother and her offspring.

Another object of this invention is the provision of an improved farm animal feeding building of novel multistory arrangement such that one or more animals can be elevated from one floor to another quickly and easily.

Yet another object of this invention is the provision of a farm animal feeding building of a multi-story nature, and having a plurality of annular feeding areas on each floor, and whereby one or more animals can be easily transported between floors within a centrally located access area.

It is another object of this invention to provide a building for feeding farm animals which is economical to manufacture, easy to assemble and construct, and effective in use, and which effects a substantial savings in space over the conventional building for this purpose, and further wherein the circular arrangement provides a basis for economically and effectively transporting the animals from one floor to another.

These objects, and other features and advantages of this invention will be readily apparent from reference to the following description, when taken in conjunction with the accompanying drawings, wherein:

FIG. 3 is a sectional view of the building taken along the line 3—3 in FIG. 2, and showing the use of the building with sheep located therein;

FIG. 4 is an enlarged sectional view taken along the line 4—4 in FIG. 3, and showing the feed mixing hopper for the building;

FIG. 5 is an enlarged, fragmentary sectional view taken along the line 5—5 in FIG. 2, and showing alternate raised and lowered positions of an elevator;

FIG. 6 is a greatly enlarged, vertical sectional fragmentary view of the junction between the upper end of the elevator and the second floor; and FIG. 7 is an enlarged elevational view of a pair of gates as seen from the lines 7—7 in FIG. 2.

Figure 1:
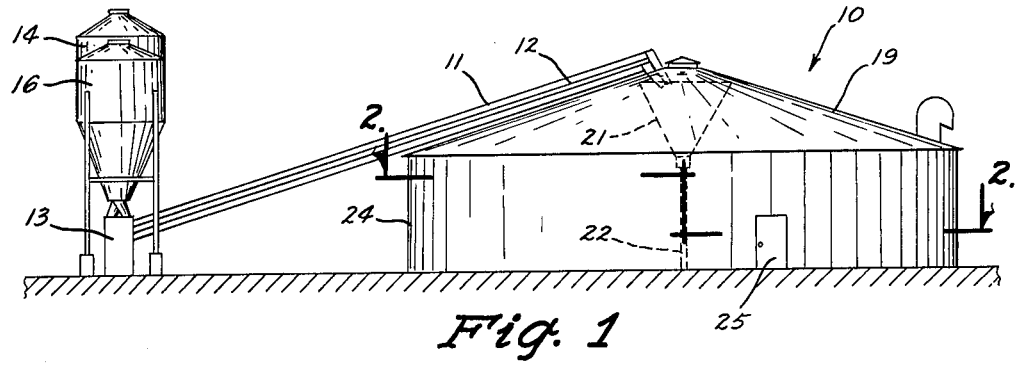
FIG. 1 is an elevational view of the farm animal feeding building of this invention in assembled relation with a pair of feed bulk tanks.

Referring to the drawings, a preferred embodiment of the livestock raising building of this invention is indicated generally at 10 in FIG. 1. Feed is supplied to the building by a pair of auger booms 11 and 12, one or both of which extend upwardly from a feed mix housing 13 mounted below a pair of bulk feed tanks 14 and 16. Grain can be supplied from one tank via the housing 13 and with or without protein or other feed supplements, while chopped hay and silage or the like can be supplied from a silo or like storage tank.

The upper ends of the booms 11 and 12 include spouts 17 and 18 (see FIG. 3) which extend through a circular roof 19 for depositing the feed into a large hopper 21. The hopper 21 doubles as a holder of granular feed material, and has a central support for the roof 19, with the hopper being of a solid funnel nature mounted on a center post 22 which in turn is supported on a concrete pedestal 23 (FIG. 3) mounted in the ground. The periphery of the roof 19 is supported by an upstanding, ground engaging wall 24 which has at least one door entrance 25 (FIG. 1) formed therein.

Generally, the interior of the building 10 comprises a ground or first floor 26 on which is placed a pair of annular, concentric rows 27 and 28 (FIG. 2) of pens or stalls 29 having an annular feed bunk unit 30 interposed therebetween, and with a pair of annular sanitation troughs 31 and 32 (FIG. 3) formed in the floor 27, one trough at each rear end—so to speak—of each row of stalls; rear end being so designated as the animals A (FIG. 3) face each other in the stalls 29 to feed.

A second floor 33 (FIGS. 3 and 5) is mounted above the first floor 26 and also has a pair of annular, concentric rows 34 and 36 of stalls 37 with an annular feed bunk unit 38 interposed therebetween. A pair of annular openings covered by grates 39 and 41 (FIGS. 2 and 5) are formed in the second floor 33, each "behind" one of the stall rows. It will be noted by referring to FIG. 5, for example, that the upper rows 34 and 36 of stalls 37 are directly over the lower, first floor rows 27 and 28 of stalls 29, that the upper grates 39 and 41 are directly over the first floor troughs 31 and 32, and that the upper feed bunk unit 38 is directly over the lower, first floor feed bunk unit 30. The importance of this will be seen hereinafter.

Mounted over both floors 26 and 33 is a feed dispensing apparatus indicated generally at 42 in FIGS. 3 and 5, which apparatus 42 is rotatably mounted at its inner end to the lower end of the hopper 21 for receiving feed therefrom. At its outer end, the apparatus 42 is rollably mounted on a track 43 supported on and extended completely around the wall 24. A plurality of spouts, to which chutes 44, 45, 46, 47, 48, 49, and 50 of canvas or the like are attached, depend from the apparatus as best illustrated in FIG. 5 for discharging feed as described more in detail hereinafter.

Both floors 26 and 33 surround a central open area defined by an annular upright partition 51 (FIG. 5) on the first floor, with a plurality of gates 52, (FIG. 2) and also by an annular upright partition 53 (FIG. 5) on the second floor, which also has a plurality of gates 54 (FIG. 2) formed therein. Within this central open area, an articulated ramp 56 (FIGS. 2, 3 and 5) is mounted for circular rotation about the area, and for raising or lowering animals to and from either of the two floors 26 and 33. The ramp 56 will be described in detail hereinafter.

More specifically, the first floor 26, comprises a layer of concrete placed above a sheet of polyethylene (not shown) or the like on a bed of gravel. The outer peripheral area 58 (FIG. 5) slopes downwardly toward the center of the building 10, until the trench 31 whereat a grate 59 is removably inserted. The floor then slopes upwardly at 61 until the feed bunk unit 30, from where it slopes downwardly again at 62 until the inner trench 32. Another grate 63 is removably placed over the trench 32. The remainder 64 of the floor 26 slopes gradually upwardly until it reaches an apex at the center post 22.

Figure 2:
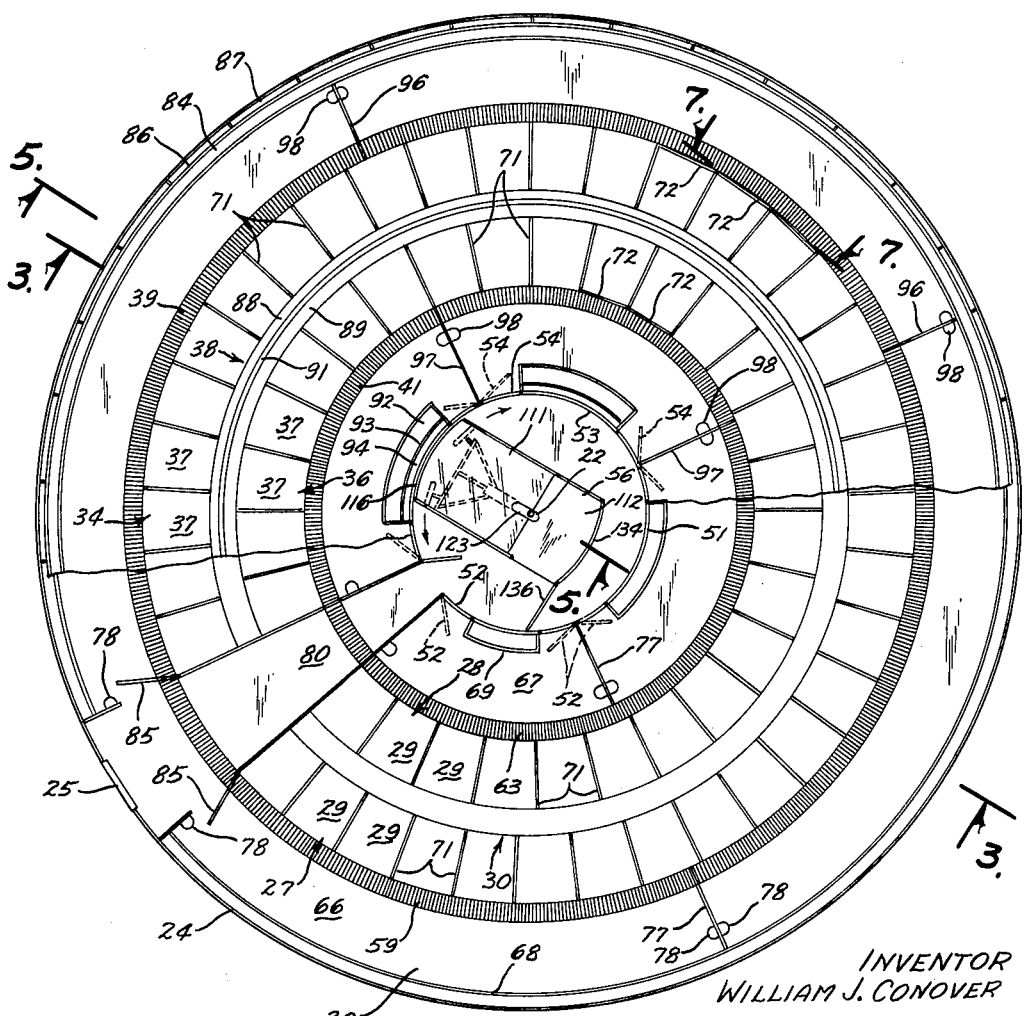
FIG. 2 is an enlarged, horizontal sectional view taken along the offset line 2—2 in FIG. 1 and showing in the lower half of the illustration the lower floor of the building, and in the upper half the upper floor thereof.

Referring to FIGS. 2 and 5, it will be seen that the annular rows 27 and 28 of stalls 29 on the first floor 26 are of a radially equal length such that an open area 66 is left between the trench 31 and the wall 24, and another open area 67 remains between the trench 32 and the partition 51. These areas 66 and 67 are usable as feeding and resting areas, in addition to the stalls 29, and each is provided with a feed bunk.

A single ingress feed bunk 68 (FIG. 5) is provided about the wall 24 for the outer area 66, and another single ingress feed bunk 69 is mounted on the inner surface of the partition 51 for the area 67. The feed bunk unit 30 (FIG. 5) has a pair of openings whereby animals from stalls in either row 27 and 28 may feed therefrom. Thus, referring now to FIG. 3, it may readily be seen that a quartet of animals A may be feeding simultaneously, or separately as the case may be.

The arrangement of the feed areas 66, 27, 28, and 68 is such, as best illustrated by the placement of the animals in FIG. 3, that each animal faces away from the trench at his rear, whereby manure and other excrement normally will fall over and into the trench, and which disposal is aided by gravity and movement of the animals due to the slope of the floor 26 described hereinbefore.

Each stall 27 is defined on each side by a fence section 71 (FIGS. 2 and 5), is closed at its inner end by the bunk 30, and is open or closed at its outer or rear end depending upon the desire of the operator. As seen in FIGS. 2 and 7, a reversible closure 72 is provided which can easily be hingedly clamped into place at the rear posts 73 of each fence section. The closure 72 has a fence portion 74 stretched across one portion, while the other portion is provided with a series of vertical bars 76. The arrangement is such, that should sheep for example be lambing in a stall 29, where the closure 72 has the bars 76 on the lower side, the lambs may pass back and forth but the ewes cannot; whereas with the fence portion 74 down, both ewes and lambs are restricted for example to the stalls.

Again referring to FIG 2, and particularly to the lower half which shows the plan of the first floor 26, it will be seen that the outer open area 66 is divided by one or more partitions 77 into sub-areas, and also that the inner open area 67 is also so divided. These divisions are arbitrary on the part of the operator. Also see a plurality of conventional automatic waterers 78 placed at desirable locations about the floor 26. An aisle 80 (FIG. 2) is formed on the first floor between the door 25 and the central area, and with gates 85 opening off into the outer annular floor area 66.

The sanitation trenches 31 and 32, best shown in cross section in FIG. 5, extend in an annular manner concentric with the center post (see FIG. 2). Both trenches slope slightly from a high side to a low part at a radial, underground trench 79 (FIG. 3) which joins the two trenches 31 and 32, and which extends beyond the building wall 24 to an atmosphere-accessible tank 81 and to a septic tank 82 or the like. Without going into detail, the grate 39 and 41 are identical, and are of steel sections of grating, although concrete slabs can be used.

The second floor arrangement is substantially the same as the first floor. The floor 33 (FIG. 5) itself is of sheet metal and is supported on a plurality of radial and arcuately spaced posts 83, but otherwise it slopes in a manner identical to the first floor 26. The upper outer feed bunk 84 has a back partition 86 which extends completely around the wall 24, and which is spaced therefrom to provide an open channel 87 through which feed from the chute 44 can be directed downwardly to the first floor outer bunk 68.

The feed bunk 38 comprises a pair of individual bunks 88 and 89 suspended over the lower bunk 30, and which are radially spaced to provide an open, vertically disposed channel 91 whereby the chute 47, between the two chutes 46 and 48 which discharge feed to the bunks 88 and 89, can drop feed therethrough to the first floor bunk 30. The upper floor inner bunk 92 is also spaced inwardly from the partition 53, and has a backing 93 to provide a channel 94 for the chute 50, whereby feed therefrom falls by gravity to the first floor inner bunk 69. Chute 49 services the upper floor bunk 92.

For economy of structure and operation, the second floor grates 39 and 41 are directly over the first floor grates 59 and 63 so that the excrement from the upper floor 33 is deposited through the first floor grates and into the trenches 31 and 32 for disposal. Referring to FIG. 2, outer and inner area dividers 96 and 97 are provided, as are automatic drinking waterers 98. The stall arrangements on the second floor 33 are identical to the first floor 26.

Referring now particularly to FIGS. 4 and 5, the feed dispensing apparatus 42 includes the hopper 21 and a horizontally disposed auger conveyor 99. Internally of the hopper 21 is a vertically disposed auger 101 rotatably mounted in bearing mounts 102 and 103 and driven by a reversible motor 104 mounted at the top of the hopper 21. Should the conveyor 99 be non-operating, rotation of the auger 101 in one direction would result in a mixing and blending of the granular material held within or being disposed within the hopper 21 (see arrows in FIG. 4). With the conveyor 99 operating normally, rotation of the auger 101 in the opposite direction will force the material downwardly within the hopper 21 and into the inner end of the conveyor 99.

The auger conveyor 99 has an auger 106 (FIG. 4) extending the entire length thereof and rotated by a motor 107 at the inner end thereof. The spouts and chutes are placed in predetermined positions and can be controlled as to discharge openings size by conventional manual or automatic means. The outer end of the conveyor 99 has a wheel 108 for rotation on the track 43, and which wheel 108 is rotated by a reversible motor 109. By this arrangement, selective and concurrent supplying of feed to either or both floors 26 and 33 is provided, and it is conceivable that selective feeding to any one or a group of stalls on either or both floors may be provided.

To transport the livestock between floors, the articulated ramp 56 was devised. The ramp includes a normally sloped floor sections 111 and a normally horizontally disposed floor section 112 pivotally interconnected at 113, and also interconnected by a hydraulic piston and cylinder unit 114. The upper end 116 (FIG. 6) of the section 111, which end is supported by a pair of stationary braces 117 as a part of a stationary framework 118, has at least a pair of rollers 119 mounted thereon.

These rollers 119 extend into a C-shaped track 121 which extends in an annular manner about the inner partition 53 of the second floor 26. The ramp framework 118 is mounted at its outer end on a pair of wheels 122 mounted concentrically with the center post 22, and as the latter extends upwardly through a radially extended opening, protected by a guard 123, it can readily be seen that the entire ramp 56 can be rotated or walked in a circular manner about the central area of the building 10, whereby to align the upper end 116 of the section 111 with any one or adjacent ones of the upper floor gates 54. The ramp 56 can be releasably locked in any one of a plurality of positions by inserting a key 138 (FIG. 6) through one of a plurality of apertures 139 formed through the track 121, which apertures are alignable with one of a plurality of passages 141 drilled diametrically through each wheel 119.

To raise the ramp from a collapsed position best shown in solid lines in FIG. 5, to a position level with the second floor 33 as shown by dotted lines therein, a first link unit 124 is provided, pivotally connected at its lower end at 126 to the framework 118 and pivotally connected at 127 to a second link unit 128. The latter unit 128 is secured to its upper end 129 to the section 111, and has pivotally connected thereto by a rock arm unit 130 the outer retractable piston end 131 of a piston and cylinder unit 132, the lower or inner end of which is connected to the first link unit 124.

Thus, when the unit 132 is retracted, the ramp 56 is collapsed, whereas upon an expansion of the unit 132 the ramp sections 111 and 112 are raised until both are level. The action is sufficiently slow that any animals carried thereby will tend to remain on the normally horizontal section 112. The unit 114 tends to maintain the section 112 level at all times and is fluidly interconnected with the unit 132. Of importance, the length of the section 112 is such that it can abut and be contiguous to the floor 33 at the free end 133, when raised, whereby animals can enter or leave the ramp at either end if desirable. Normally an upright guard 134 and a gate 136 are provided there to aid in corraling the livestock.

Although a preferred embodiment of this invention has been disclosed and described herein, it is to be remembered that various modifications and alternate constructions can be made without departing from the true spirit and scope of the invention as defined by the appended claims.

I claim:
1. A farm animal feeding building comprising:
an upstanding wall forming a substantially circular enclosure and covered by a roof;
a ground floor having at least a pair of concentric rows of stalls for holding livestock therein, and a single feeding area intermediate said rows of stalls for supplying feed to both rows of stalls;
a second floor spaced above said ground floor, having a pair of spaced concentric rows of stalls, said second floor stalls having feeding areas at adjacent ends thereof; and
feed dispensing means mounted within said enclosure, below said roof and above said second floor, said means including means for transmitting feed selectively to said second floor feeding areas and through said space between the second floor rows of stalls to said first floor feeding area.

2. A farm animal feeding building comprising:
an upstanding wall forming a substantially circular enclosure and covered by a roof;
a ground floor;
an annular feed bunk mounted on said ground floor concentric with the center of said building;
a pair of annular, concentric rows of stalls on either side of and contiguous with said bunk, wherein animals within said rows can feed from said bunk;
a second floor spaced above said ground floor;
a pair of radially spaced annular feed bunks mounted on said second floor above and over said ground floor bunk; and
means above said second floor for dispensing feed selectively into said second floor bunks and through said space therebetween, said feed dispensed through said space falling into said first floor bunk.

3. A farm animal feeding building comprising:
an upstanding wall forming a substantially circular enclosure and covered by a roof;
a ground floor;
an annular feed bunk mounted on said ground floor concentric with the center of said building;
a pair of annular, concentric rows of stalls on either side of and contiguous with said bunk, wherein animals within said rows can feed from said bunk;
said ground floor having a pair of annular sanitation troughs formed therein, each trough contiguous with an end of a row radially opposite said feed bunk, and wherein said ground floor slopes downwardly from said bunk toward both said troughs;
a second floor spaced above said ground floor, having a pair of spaced concentric rows of stalls, said second floor stalls having feeding areas at adjacent ends thereof;
said second floor having a grate-covered annular opening formed therein at an end of each second floor row opposite said feeding areas;
said second floor sloped downwardly from said feeding areas toward said grate-covered openings; and
means for dispensing feed simultaneously to said second floor feeding areas, and through the space therebetween to said ground floor bunk.

4. A farm animal feeding building as defined in claim 3, and further wherein an open circular area is formed within said enclosure, which open area is surrounded by said annular, concentric rows of stalls.

5. A farm animal feeding building comprising:
an upstanding wall forming a substantially circular enclosure and covered by a roof;
a ground floor;
an annular feed bunk mounted on said ground floor concentric with the center of said building;
a pair of annular, concentric rows of stalls on either side of and contiguous with said bunk, wherein animals within said rows can feed from said bunk;
a second floor spaced above said ground floor;
a pair of radially spaced annular feed bunks mounted on said second floor above and over said ground floor bunk;
a pair of annular, concentric rows of stalls formed on said second floor, one row on an inner side of the innermost feed bunk and the other row on an outer side of the outermost feed bunk;
means above said second floor for dispensing feed selectively into said second floor bunks and through said space therebetween, said feed dispensed through said space falling into said first floor bunk;
said upper and lower annular stalls having each innermost stall surround an open area centrally of said enclosure; and
means mounted in said open area for transmitting animals from one floor to another.

6. A farm animal feeding building comprising:
an upstanding wall forming a substantially circular enclosure and covered by a roof;
a ground floor;
an annular feed bunk mounted on said ground floor concentric with the center of said building;
a pair of annular, concentric rows of stalls on either side of and contiguous with said bunk, wherein animals within said rows can feed from said bunk;
a second floor spaced above said ground floor;
a pair of radially spaced annular feed bunks mounted on said second floor above and over said ground floor bunk;
a pair of annular, concentric rows of stalls formed on said second floor, one row on an inner side of the innermost feed bunk and the other row on an outer side of the outermost feed bunk;

means above said second floor for dispensing feed selectively into said second floor bunks and through said space therebetween, said feed dispensed through said space falling into said first floor bunk;

said upper and lower annular stalls having each innermost stall surround an open area centrally of said enclosure; and elevator means rotatably mounted at one end on the ground floor within said open area, and at the other end to said second floor, and capable of moving one or more animals between said ground floor and said second floor.

7. A farm animal feeding building comprising;
an upstanding wall forming a substantially circular enclosure and covered by a roof;
a ground floor;
an annular feed bunk mounted on said ground floor concentric with the center of said building;
a pair of annular, concentric rows of stalls on either side of and contiguous with said bunk, wherein animals within said rows can feed from said bunk;
a second floor spaced above said ground floor;
a pair of radially spaced annular feed bunks mounted on said second floor above and over said ground floor bunk;
a pair of annular, concentric rows of stalls formed on said second floor, one row on an inner side of the innermost feed bunk and the other row on an outer side of the outermost feed bunk;
means above said second floor for dispensing feed selectively into said second floor bunks and through said space therebetween, said feed dispensed through said space falling into said first floor bunk;
said upper and lower annular stalls having each innermost stall surround an open area centrally of said enclosure; and
elevator means mounted in said open area and movable from a ground floor engaged position where one or more animals can be walked thereon, to an elevated, horizontally disposed position whereat said one or more animals can be walked onto said second floor.

8. A farm animal feeding bulding as defined in claim 7, and further wherein said elevator means is rotatable about the center of said open area.

9. A farm animal feeding building as defined in claim 8, and further wherein said elevator means is engageable at either end with the floor of said second floor, being extended completely across said open area.

10. A farm animal feeding building comprising:
an upstanding wall forming a substantially circular enclosure and covered by a roof;
a ground floor;
an annular feed bunk mounted on said ground floor concentric with the center of said building;
a pair of annular, concentric rows of stalls on either side of and contiguous with said bunk, wherein animals within said rows can feed from said bunk;
a second floor spaced above said ground floor;
a pair of radially spaced annular feed bunks mounted on said second floor above and over said ground floor bunk; and
means above said second floor for dispensing feed selectively into said second floor bunks and through said space therebetween, said feed dispensed through said space falling into said first floor bunk,
said feed dispensing means including a gravity fed hopper having a vertically disposed auger mounted therein for selectively mixing the granular feed material therein by a vertically disposed circulatory tumbling action.

References Cited by the Examiner

UNITED STATES PATENTS

| | | | |
|---|---|---|---|
| 1,186,444 | 6/1916 | Schuchardt | 119—16 |
| 2,704,051 | 3/1955 | Heiskell | 119—52 |
| 3,103,912 | 9/1963 | Benedetto | 119—14.04 |
| 3,108,571 | 10/1963 | Patz | 119—51 |
| 3,148,663 | 9/1964 | Conover | 119—16 |
| 3,191,577 | 6/1965 | McMurray | 119—16 |
| 3,205,859 | 9/1965 | Fine et al. | 119—52 |

SAMUEL KOREN, *Primary Examiner.*

ALDRICH F. MEDBERY, *Examiner.*